United States Patent [19]

Allanach et al.

[11] Patent Number: 5,325,406
[45] Date of Patent: Jun. 28, 1994

[54] QUICK INSTALLATION NON-BOLTED NOZZLE DAM SYSTEM

[75] Inventors: John R. Allanach, Southbury; Donald D. Stenabaugh, Waterbury, both of Conn.

[73] Assignee: The Brand Companies, Westchester, Ill.

[21] Appl. No.: 121,394

[22] Filed: Sep. 15, 1993

[51] Int. Cl.$^5$ .............................................. G21C 13/00
[52] U.S. Cl. ..................................... 376/203; 376/263
[58] Field of Search .................. 376/263, 203; 138/93, 138/89

[56] References Cited

U.S. PATENT DOCUMENTS

| | | | |
|---|---|---|---|
| 3,161,037 | 12/1964 | Lagerquist | 70/169 |
| 4,351,446 | 9/1982 | Madden | 220/210 |
| 4,637,588 | 1/1987 | Wilhelm et al. | 251/280 |
| 4,667,701 | 5/1987 | Evans et al. | 138/93 |
| 4,684,491 | 8/1987 | Rylatt | 376/203 |
| 4,826,036 | 5/1989 | Lewis et al. | 220/232 |
| 5,007,460 | 4/1991 | Zezza et al. | 138/89 |

Primary Examiner—Donald P. Walsh
Assistant Examiner—Frederick H. Voss
Attorney, Agent, or Firm—Robert A. Seemann

[57] ABSTRACT

A nozzle dam automatically latches on an annular ledge surrounding the nozzle opening. A pivotal latch arm on the dam, biased to the locked position is forced toward the unlocked position by a cam on the ledge as the nozzle is pressed on the ledge, and snaps into engagement with the ledge when the dam is fully seated over the opening. A bias arm may be operated by a wrench to pivot the latch arm toward the unlocked position until a detent locks the latch arm in the unlocked position.

14 Claims, 7 Drawing Sheets

QUICK INSTALLATION NON-BOLTED NOZZLE DAM SYSTEM

BACKGROUND OF THE INVENTION

1. Field of the Invention

This invention pertains in general to a closure with inflatable seals for sealing a nozzle opening into a nuclear steam generating vessel, and more particularly, to a self latching nozzle dam which can be installed quickly without having to align screws or pins between the nozzle dam and nozzle wall or nozzle hold down ring.

2. Description of the Prior Art

Many nozzle dam designs are described in the prior art which have as their objective, quick installation features in order to minimize exposure time to nuclear radiation, which exists in the immediate work environment within the vessel.

For example, U.S. Pat. No. 4,667,701, patented by Evans et al. May 26, 1987, describes a nozzle dam sealing system having a permanent flange ring that is concentric with the circular opening of the nozzle, welded to the inside surface of the steam generator around the opening. Typical of installations presently in use, the ring has threaded holes for fastening a dam in place over the nozzle.

An insert, designed to receive a bayonet fastener, is screwed into each threaded hole.

A collapsible, adjustable, support frame similar to a pantograph, has bayonet pin means hingedly attached to one end of the frame, and bayonet pin means attached to the other end without hinges. The support frame is attached by the hinged bayonet pin means to the ring, and oriented vertically, normal to the nozzle ring.

The dam plate of the system, which retains the inflatable seal, is provided in three sections for assembly on the hingedly mounted support frame. The dam plate is in three sections because it must be passed into the vessel by way of a manway which is smaller than an assembled dam.

After assembly of the dam on the frame, the frame with dam is rotated down on the hinged bayonet means attachment until the pins at the other end of the pantograph frame can be installed in the inserts on the opposite side of the opening.

In order to avoid a source of delay during installation of the nozzle dam, assembly of the dam and frame must be accurate, so that the bayonet means align each with a respective insert when the dam is rotated down onto the ring to find the proper seating.

U.S. Pat. No. 5,007,460, patented Apr. 16, 1991 by Zezza et al., improves on U.S. Pat. No. 4,667,701. The nozzle dam is installed into the nozzle opening before the pantograph beams. This reduces the time required to install the nozzle dam system. Six bayonet pins attached to the ends of the beams provide the attachment to the inserts installed in the flange ring.

In order to be able to install the nozzle dam efficiently within the vessel, measurements of the nozzle must be applied to adjusting the pantograph and dam assembly in advance of the actual installation.

U.S. Pat. No. 4,826,036, patented May 2, 1989 by Lewis et al., describes a system which uses toggle type action clamps located at about six points about the circumference of the dam, each to drive a pin radially from the dam into a pocket in the nozzle to secure the nozzle dam in the nozzle. The movement of the pin towards the pocket is also used to generate hydraulic pressure for the expandable seal by way of a plunger that is press-fit on the pin. The plunger, carried by the advancing pin, presses against a bladder containing the hydraulic fluid.

Orientation of each pin with a corresponding pocket is necessary for successful closure.

U.S. Pat. No. 4,637,588, patented Jan. 20, 1987 by Wilhelm et al. describes a system which avoids need to align a screw or pin on the dam with corresponding receiving means in the nozzle.

This two-stage system has a foldable sealing nozzle dam plate with an anchor assembly below the plate attached to it by a vertical, threaded shaft assembly that passes up through the plate.

The anchor assembly includes a plurality of arms in a tripod arrangement which may be opened from a folded position, to extend radially from the vertical shaft into frictional engagement with the inner surface of the nozzle. The tripod arrangement is designed to increase radial pressure of the arms against the nozzle surface by movement of a linkage arm coupling of the tripod arrangement up the threaded shaft as the shaft is rotated.

SUMMARY OF THE INVENTION

It is one object of the present invention to provide a nozzle dam that is quick and easy to install and remove from a nozzle.

It is another object that the above nozzle dam be attachable to the nozzle without the need of aligning bolts or screws with receiving means on the nozzle.

Another object is that the above nozzle dam be attachable without need of a second stage attachment to the dam.

Another object is that the nozzle dam be installable without regard to rotational position of the dam on the nozzle.

Another object is that the nozzle dam be locked on the nozzle simply pressing it down over the nozzle, thereby engaging locking means without need to manipulate fastener means during or after pressing the dam down over the nozzle to establish the lock.

Another object of the invention is that a sectional nozzle dam can be locked directly on the nozzle, section by section of the nozzle dam.

Another object is that the locking means contribute to self centering of the nozzle dam over the nozzle.

Still another object of the invention is that the locking means be easily and quickly disengageable from the nozzle when it is desired to remove the nozzle dam from the nozzle.

Yet another object of the invention is that the locking means be carried into the vessel, on the nozzle dam, when the dam is taken into the vessel folded or in sections.

Other objects and advantages will become readily apparent to a reader from the ensuing description of the invention.

In the present invention nozzle dam for sealing a nozzle having an opening into a nuclear reactor steam generating vessel and a wall comprising the opening, the nozzle dam includes a top, a bottom, and means for sealing the nozzle opening by bearing the means for sealing against the wall.

Latch receiving means are on the wall for receiving latch means on the nozzle dam, for retaining the dam on the opening with the bottom of the dam toward the opening, for sealing the opening.

The latch means is automatically self locking with the latch receiving means when the dam is placed over the opening.

Preferably the latch receiving means is a ledge on the wall, outside the opening, and generally parallel with the dam when the dam is over the opening.

The latch means is adapted for moving in a plane that is generally parallel to the dam when the latch means is moving into engagement with the latch receiving means.

Preferably the movement into engagement is generally radially inward.

In the present invention, the dam does not require threaded fasteners, pins or separate clamps for attachment to the hold-down ring. As the dam is placed on the ring, spring-loaded latches automatically pivot to a closed position to engage the underside of a ledge which is machined into the outer periphery of the ring. As the ledge is continuous all around the ring, orientation of the dam is not necessary for proper engagement with the ring.

Nozzle dam removal is achieved by pivoting the latches out of the ring to an open position by use of an open-end wrench. The latches are pivoted out until at 20 degrees they are automatically held in the open position by a spring loaded detent plunger which drops into an opening in the latch body.

The nozzle dam is prepared for snap-on installation by drawing back of all plungers, whereupon the latches, under spring load, pivot to the vertical. When the dam is pressed down on the ring during installation of the nozzle dam, each latch needs to pivot out only 10 degrees under a camming action between the latch and the ring, for it to slide over the upper, outer edge of the hold-down ring and lock in under the ledge.

Preferably the ledge surface is flat. It may, however be curved or angled such as with an annular raised ridge for progressive engagement of the latch. It may also include radially oriented curves, although this could require orientation of the dam for proper engagement of the latch and the ring.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
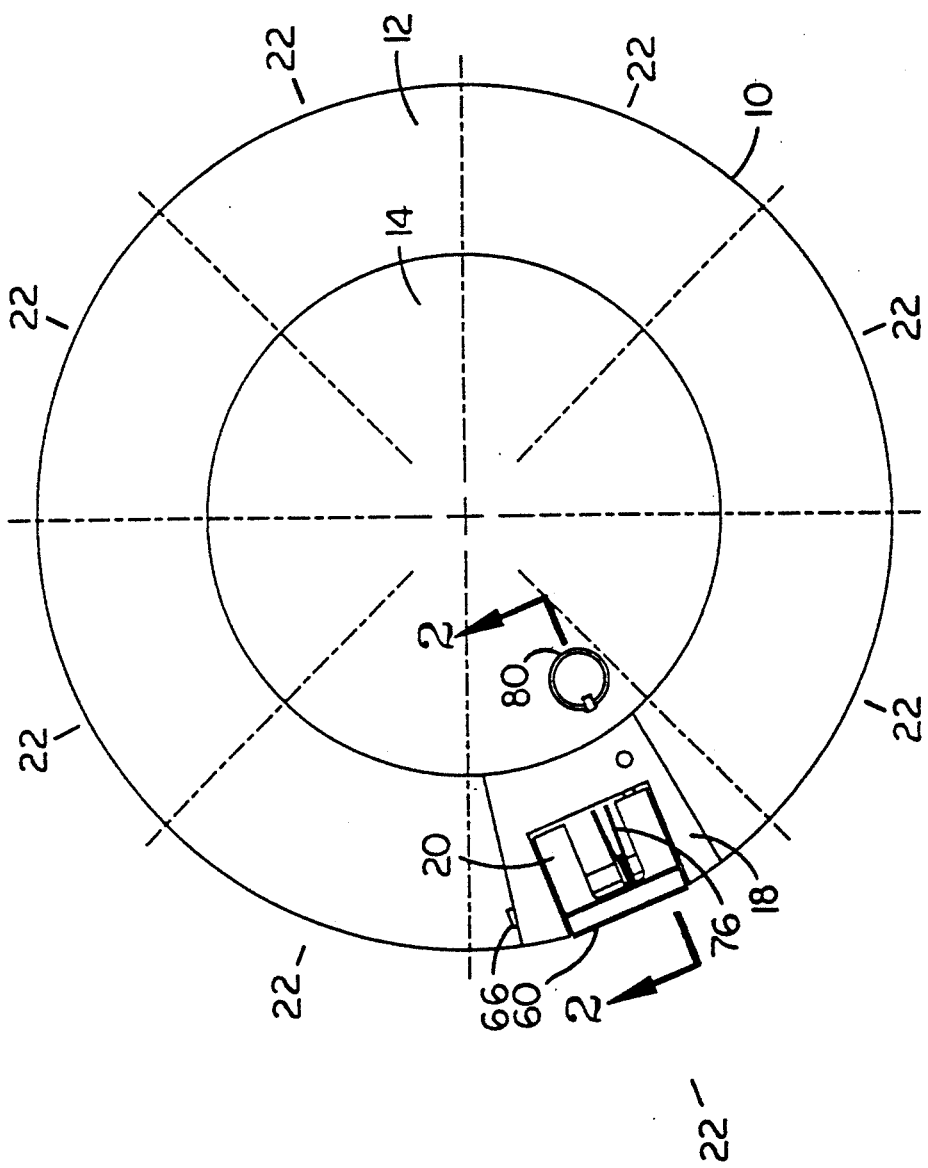
FIG. 1 is a top view of a nozzle dam of the present invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIG. 1, annular rim 12 of nozzle dam 10 is concentric with annular contoured portion 14. It includes thicker frame 18 with latch 60. Latch frame 18 supports body 20 of latch 60 on pivot shaft 66.

A plurality of latch frames (not shown) are supported by the dam along the rim, such as within each segment 22 of the eight segments shown.

Figure 2:
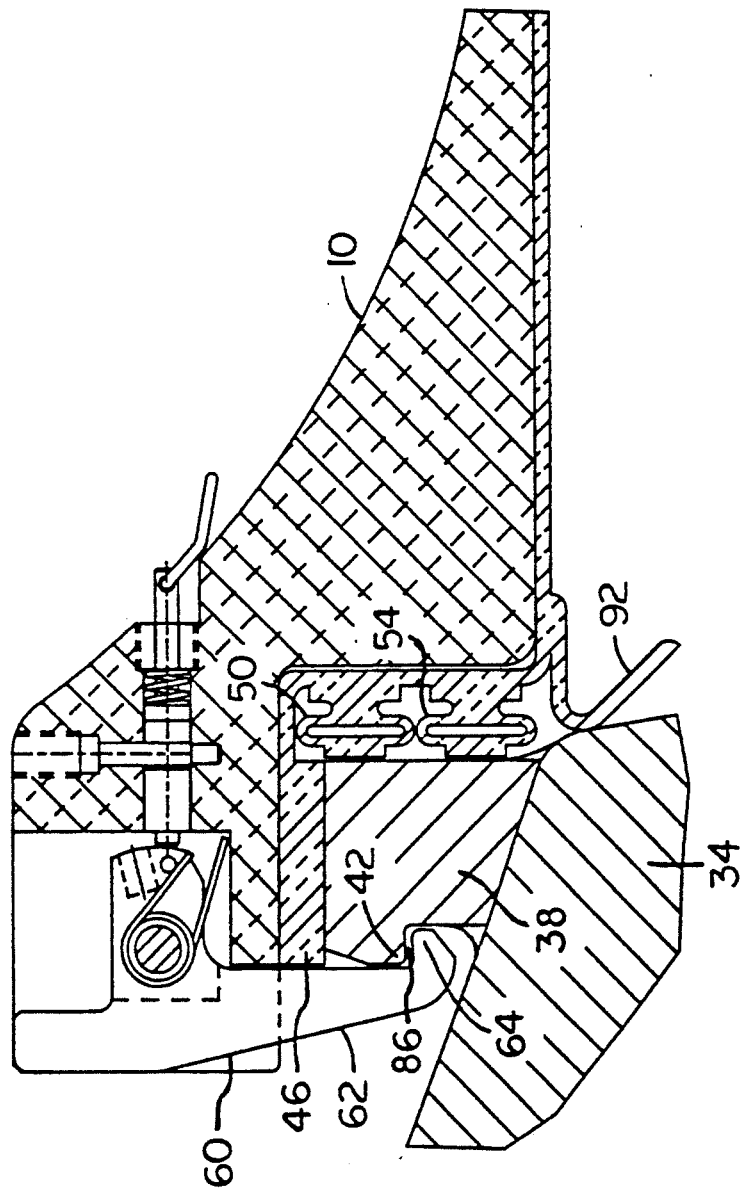
FIG. 2 is a side section view of the latching system in FIG. 1, taken along line 2—2.
Figure 3:
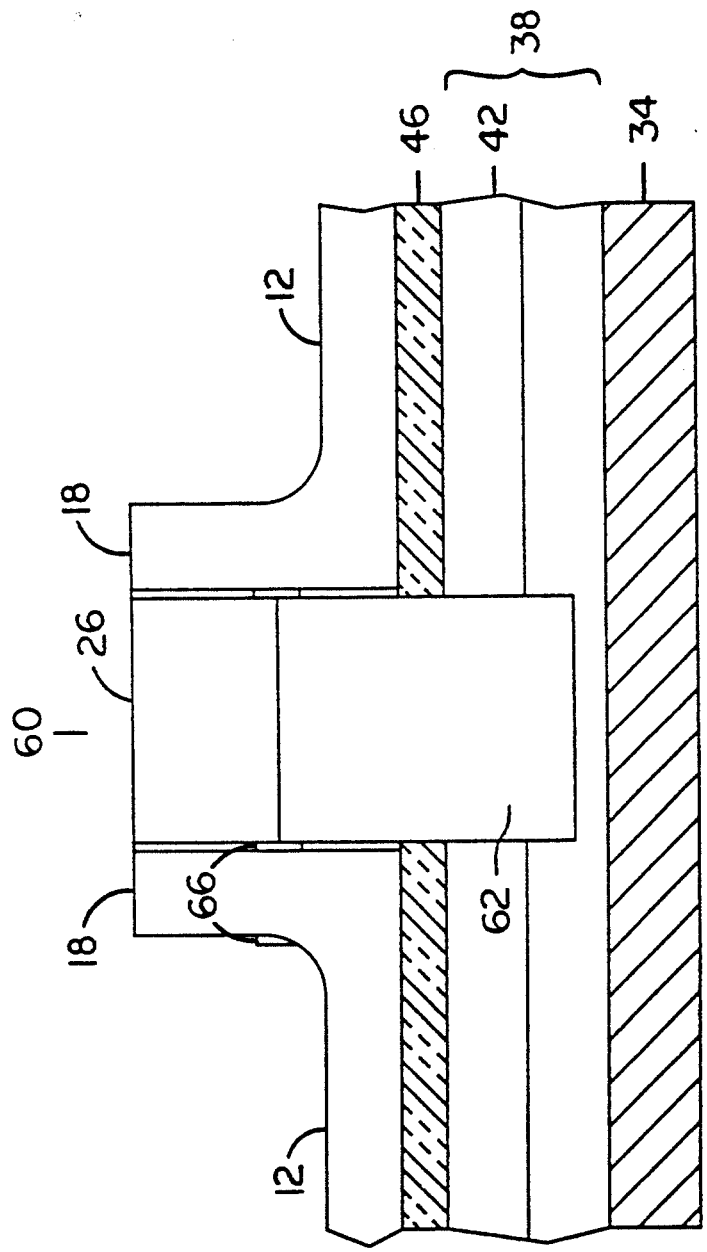
FIG. 3 is a front view of the latching system in FIG. 1 as viewed at the perimeter of a dam and nozzle assembly.

Referring to FIGS. 2 and 3, latch 60 is fully engaged with hold-down ring 38 which is welded onto nozzle wall 34. Ledge 42 receives engagement tip 64 of latch arm 62.

Ledge 42 is preferably machined all around the ring, but can be an upper portion of the inner wall of a hole. It can be in a section of a discontinuous ring of sections, one at each latch location as shown in FIG. 4.

Nozzle dam 10 is resting on rubber seal 46 which lies between the dam and the ring.

Figure 4:
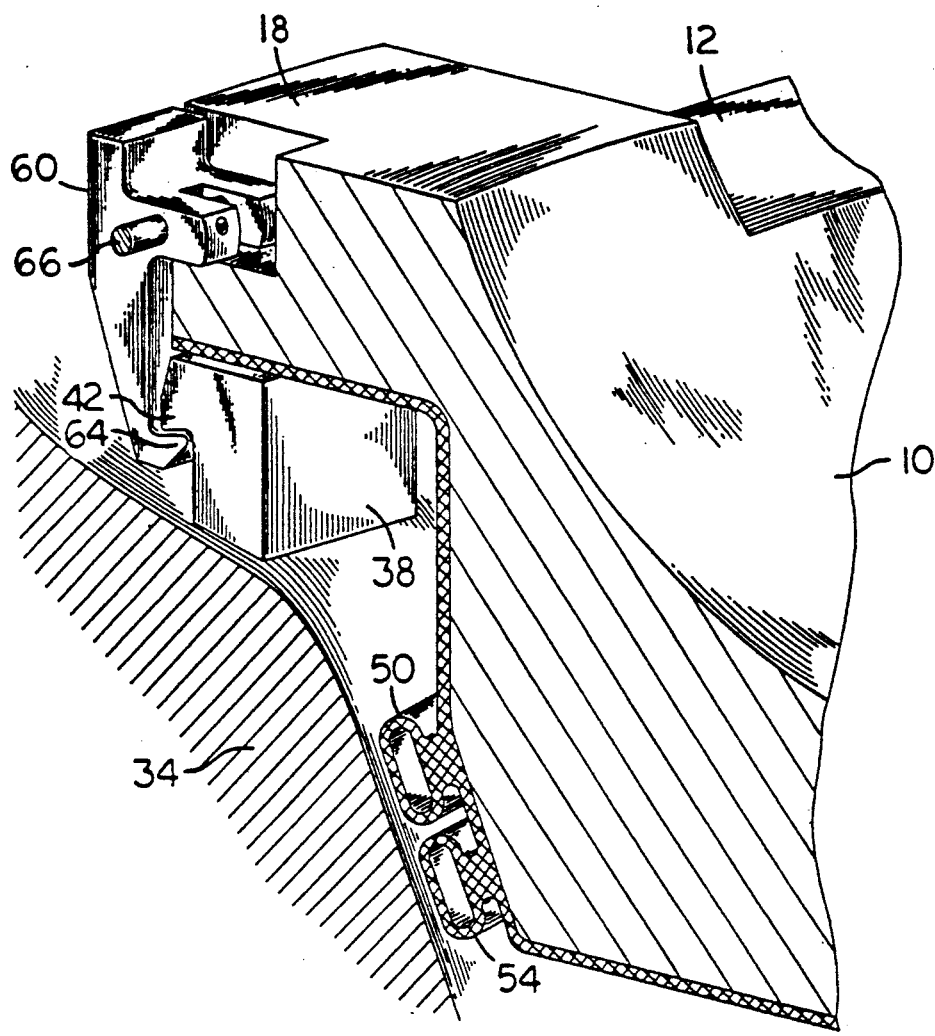
FIG. 4 is an elevated perspective view of a latch receiving means according to the invention.
Figure 5:
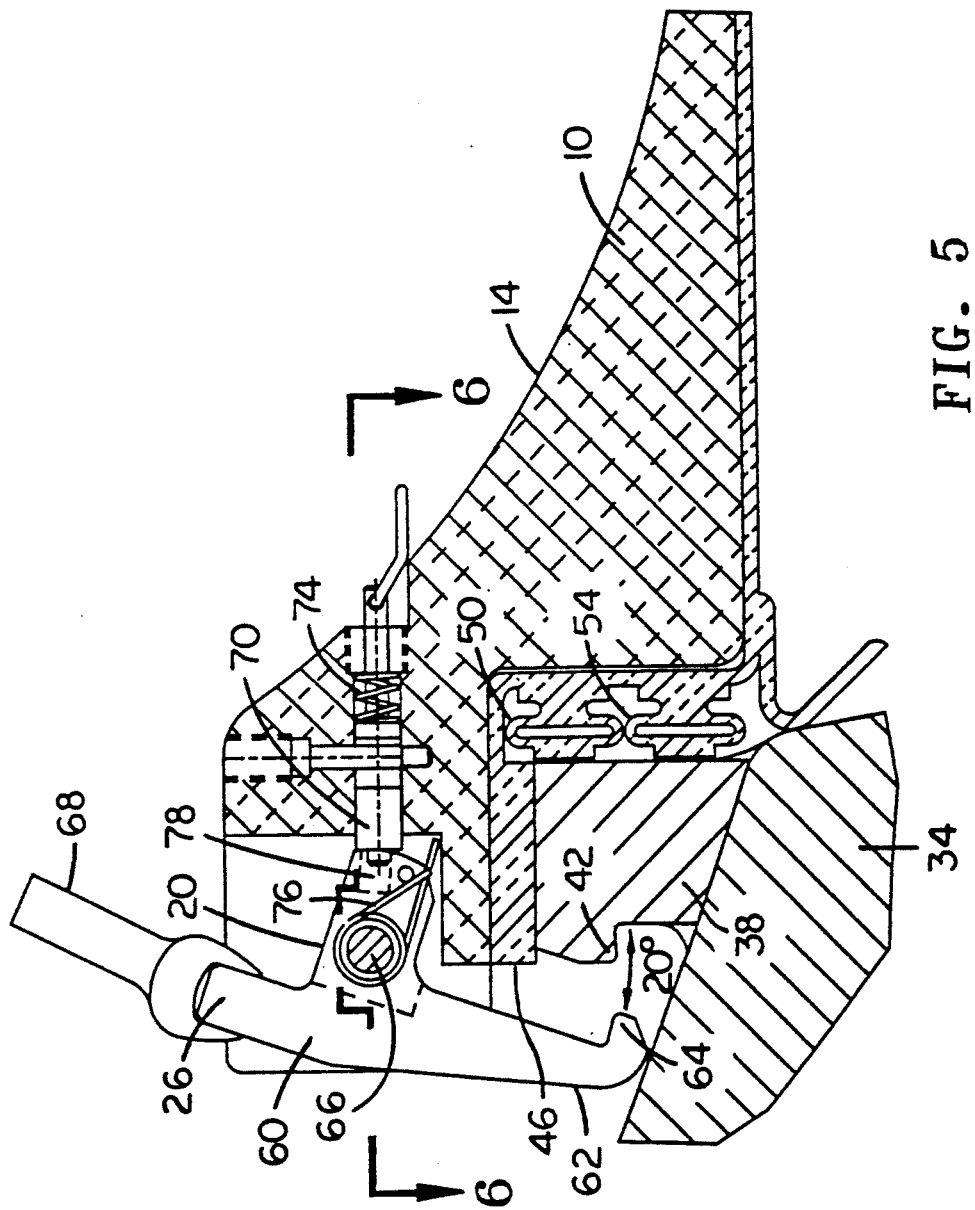
FIG. 5 is a side section view of the latching system, unlatched from the nozzle.

Latch 60 keeps the dam in position on the ring, for inflation of expandable, inflatable rubber seals 50 and 54 which provide the main hydraulic seal between the dam and the nozzle wall as shown in FIGS. 2, 4, and 5.

Clearance 86 between tip 64 and hold down ring annular ledge 42 is provided to ease movement of the tip into and out from under ledge 42. Contact between tip 64 and ledge 42 is made when the dam moves up under influence of water pressure in operation. This contact helps secure the dam on the nozzle against vertical hydraulic pressures which the dam may encounter. Inflatable seals 50 and 54, when inflated, provide primary resistance against leakage of water in the nozzle past the dam by means of their radial sealing action against the ring.

Mechanical seal 92, enforced by water pressure, provides back-up sealing should the inflatable rubber seals fail.

FIG. 5 shows nozzle dam 10 being unlatched from ledge 42 of hold-down ring 38.

Under bending force from wrench 68 on bias arm 26, body 20 rotates on pivot shaft 66 against opposite torque force from spring 76, and engagement tip 64 of latch arm 62 moves radially out from under annular ledge 42. When latch arm 62 pivots out 20 degrees, detent plunger 70, under urging of spring 74, engages opening 78 in latch body 20, holding the latch open for removal of the dam from the nozzle.

Figure 6:
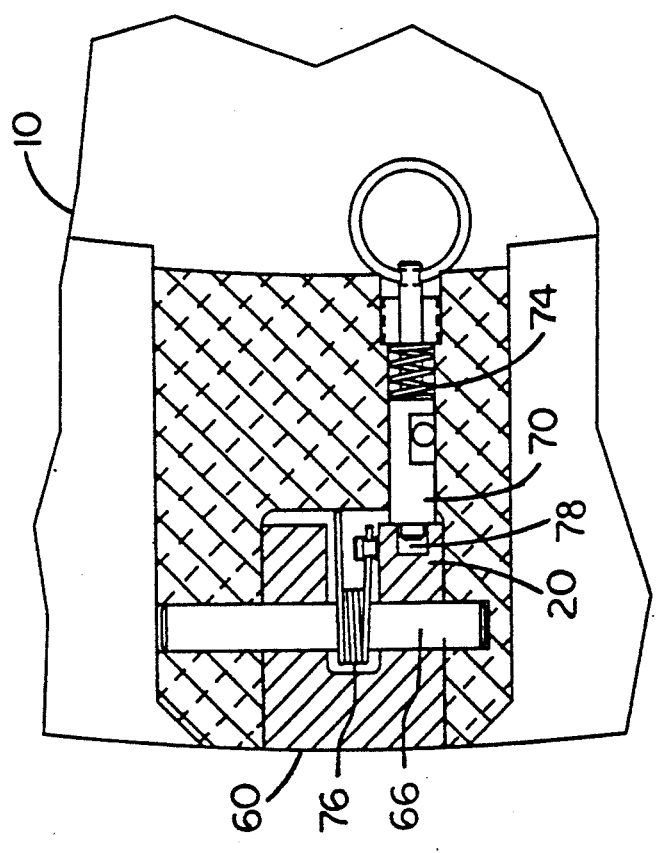
FIG. 6 is a top section view of the latching system of FIG. 5 taken along line 6—6.

FIG. 6 shows the pivot assembly in FIG. 2 as viewed from 6—6.

Figure 7:
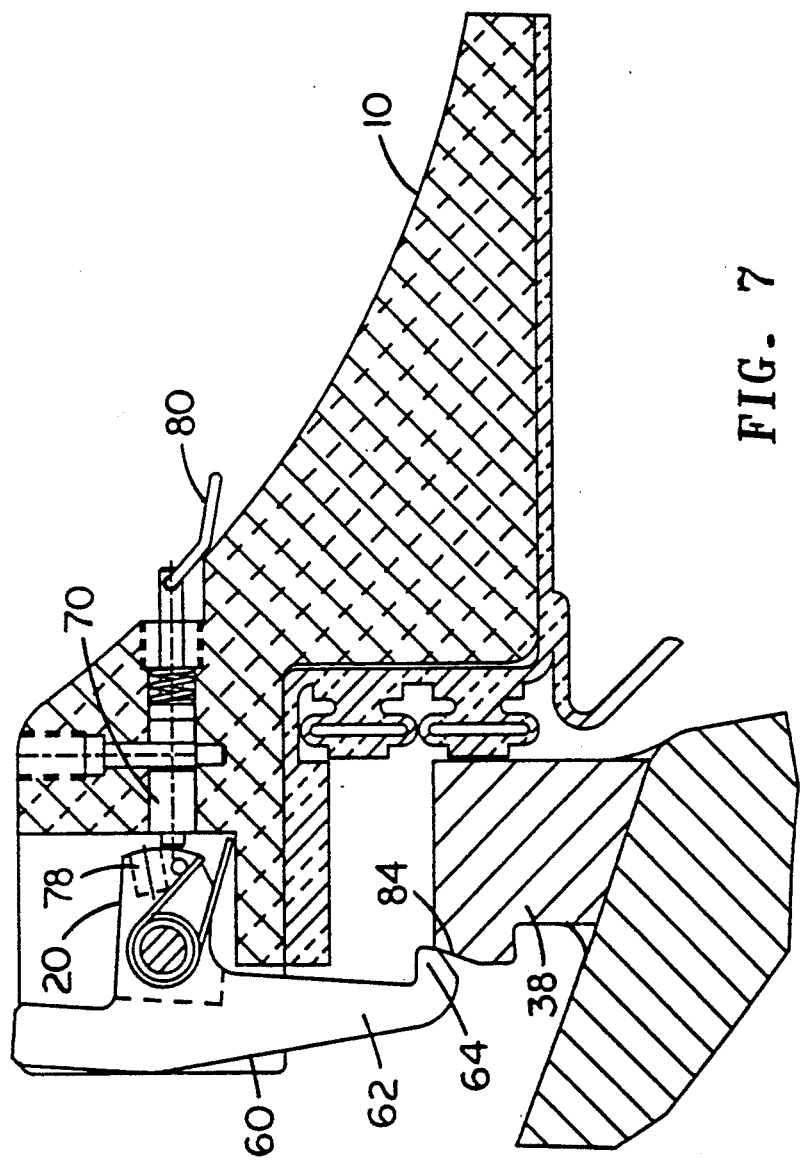
FIG. 7 is a side section view of the latching system, with the dam being installed on the nozzle.

FIG. 7 shows the nozzle dam being dropped onto hold down ring 38. In preparation for installation of the nozzle dam on the hold-down ring, plunger 70 was drawn back out of opening 78 by pull ring 80. With plunger 70 removed from opening 78, latch 60 pivoted to the vertical. FIG. 7 shows latch 60 pivoted out about 5 degrees due to outward camming force of the engagement of latch tip 64 with chamfer 84 on hold-down ring 38, as the latch tip slips down across the ring.

Although the invention has been described in terms of specific preferred embodiments, it will be obvious to one skilled in the art that various modifications and substitutions are contemplated by the invention disclosed herein and that all such modifications and substitutions are included within the scope of the invention as defined in the appended claims.

What is claimed is:

1. In a nozzle dam system for sealing a nozzle of a nuclear steam generating vessel, said nozzle comprising an opening into said vessel and a wall comprising said opening, said system comprising:

a nozzle dam including a top, a bottom, and means for sealing said nozzle opening by bearing of said means for sealing against said wall, latch means on said nozzle dam, and latch receiving means on said wall for receiving said latch means for retaining said dam on said opening with said bottom toward said opening, for sealing said opening, said latch means being automatically self locking with said latch receiving means when said dam is placed over said opening.

2. The nozzle dam system described in claim 1, further comprising:

said latch receiving means being outside said opening, said latch means being adapted for moving in a plane generally parallel to said dam when said latch means is moving into engagement with said latch receiving means.

3. The nozzle dam system described in claim 2, further comprising:

said latch means moving generally radially inward when moving into engagement with said latch receiving means.

4. The nozzle dam system described in claim 2, further comprising:

said latch receiving means being a ledge on said wall, said ledge being generally parallel with said dam when said dam is over said opening, said ledge being for receiving said latch for said retaining of said dam.

5. The nozzle dam system described in claim 4, further comprising:

said latch means moving generally radially inward when moving into engagement with said latch receiving means.

6. The nozzle dam system described in claim 4, further comprising:

said latch receiving means comprising a ring surrounding said opening.

7. The nozzle dam system described in claim 6, further comprising:

said ring being continuous, said ledge being continuous on said ring.

8. The nozzle dam system described in claim 2, further comprising:

said latch means being moveable between a disengaging position and a full engagement position, and cam means on said latch receiving means for moving said latch means from said full engagement position toward said disengaging position when said dam is moving into place over said opening.

9. The nozzle dam system described in claim 1, further comprising:

said latch means comprising pivot means mounted on a peripheral portion of said dam, an arm, said arm comprising an engagement tip and being mounted on said pivot means for radial movement of said pivot tip below said pivot means between a locked and an unlocked position, said latch receiving means comprising an annular radial wall on said wall comprising said opening, said annular radial wall being for receiving said pivot tip below said annular radial wall in the locked position for retaining said dam on said opening.

10. The nozzle dam system described in claim 9, further comprising:

spring means on said latch means for biasing said pivot tip in the locking direction.

11. The nozzle dam system described in claim 10 further comprising:

detent means on said latch means for maintaining said pivot tip in the unlocked direction until said detent means be released.

12. The nozzle dam system described in claim 10 further comprising:

bias arm means on said latch means for moving said pivot tip in the unlocked direction.

13. The nozzle dam system described in claim 10 further comprising:

cam means comprising said pivot tip and latch receiving means, for moving said pivot tip in the unlocked direction.

14. The nozzle dam system described in claim 11, further comprising:

said locking position of said pivot tip being radially inward with respect to said dam.

* * * * *